United States Patent Office 3,156,537
Patented Nov. 10, 1964

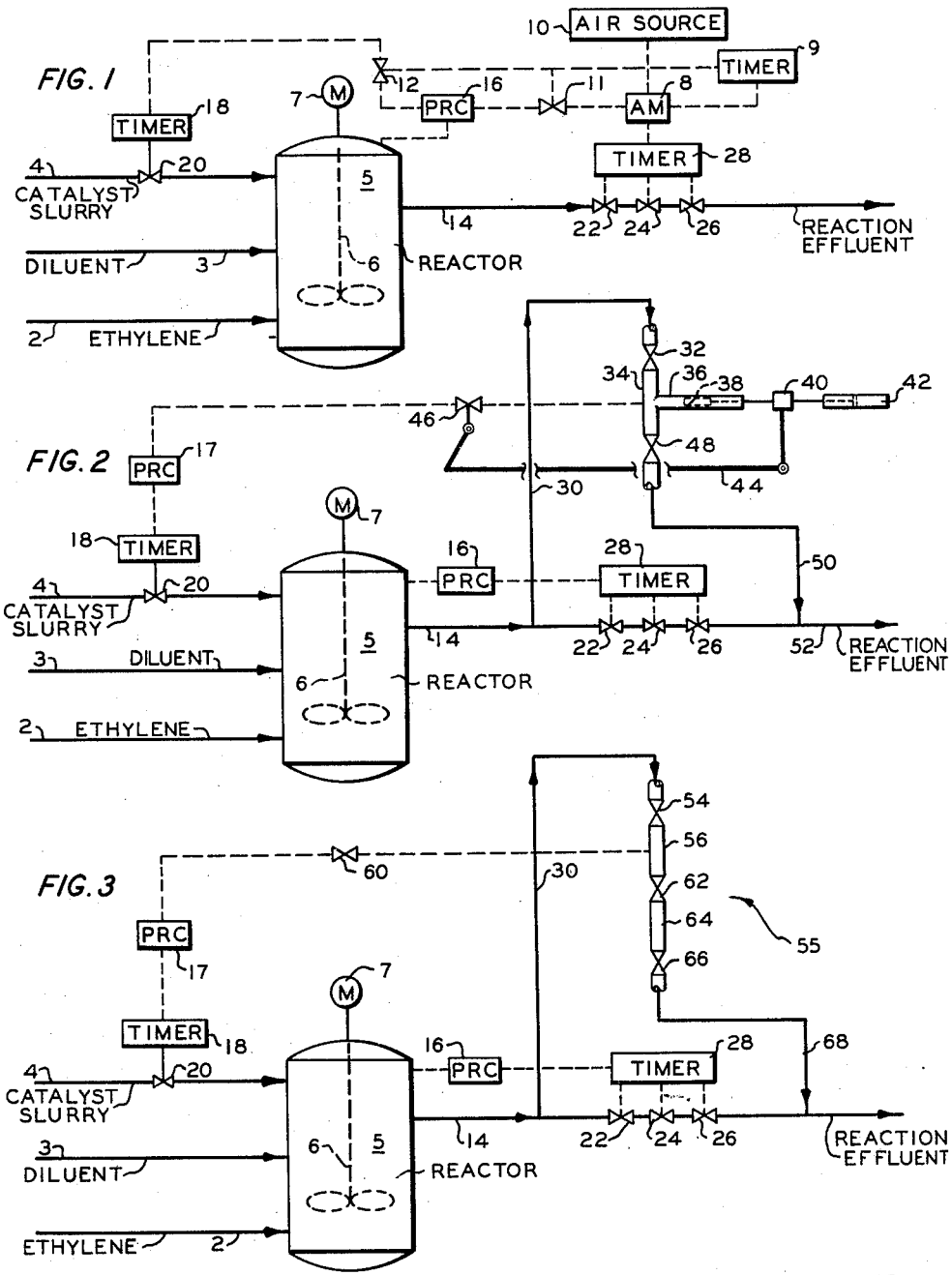

3,156,537
METHOD AND APPARATUS FOR CONTROLLING CATALYST CONCENTRATION IN THE PRODUCTION OF SOLID OLEFIN POLYMERS
Norman F. McLeod, Borger, Tex., assignor to Phillips Petroleum Company, a corporation of Delaware
Filed May 25, 1959, Ser. No. 815,689
9 Claims. (Cl. 23—288)

This invention relates to the control of catalyst concentration in the polymerization of olefins to normally solid polymers. In one aspect the invention relates to controlling catalyst concentration in a process in which olefin polymerization is carried out in a liquid full reaction zone. In another aspect the invention relates to controlling catalyst concentration in the preparation of "particle form" olefin polymers.

It has been found that the polymerization of olefins to normally solid polymers is very sensitive to variations in the concentration of the polymerization catalyst. Catalyst concentration is particularly important in the preparation of high molecular weight polymers of ethylene which are insoluble in the hydrocarbon diluent which is ordinarily present in the polymerzation system. These polymers are formed in association with polymerization catalyst and are suspended in the liquid diluent in solid particle form. The preparation of insoluble particle form polymer is disclosed in the copending application of Leatherman et al., Serial No. 590,567, filed June 11, 1956, now abandoned. In the following discussion the term "particle form polymer" will be employed to designate the insoluble polymers of ethylene formed in accordance with the Letherman et al. application.

In the polymerization reaction variations in catalyst concentration produce changes in the reaction temperature, which in turn affects the solubility of the olefin polymers. Solubility of the polymer in the polymerization reaction diluent is an important factor in maintaining the reactor and other process equipment free from polymer deposition and fouling. It is important therefore that the polymerization reaction temperature and thus catalyst concentration be closely controlled in the polymerization reaction.

It is an object of this invention to provide improved process and apparatus for the control of polymerization of olefins to normally solid polymers.

Another object of this invention is to provide improved process and apparatus for the control of catalyst concentration in the polymerization of olefins to normally solid polymers in a liquid full reaction system.

Still another object of this invention is to provide improved process and apparatus for controlling catalyst concentration in the preparation of "particle form" olefin polymers.

Yet another object of this invention is to provide improved method and apparatus for minimizing polymer deposition and fouling of process equipment in the polymerization of olefins to normally solid polymers.

These and other objects of the invention will become more readily apparent from the following detailed description and discussion.

The foregoing objects are achieved broadly by polymerizing an olefin to a normally solid polymer in a liquid full reaction zone in the presence of a liquid diluent and a subdivided polymerization catalyst, measuring the olefin saturation pressure in said reaction zone and varying the catalyst feed rate to the reaction zone in response to and directly proportional to said saturation pressure. It has been found that the olefin saturation pressure is very sensitive to the reactivity of the polymerization system and accurately reflects changes in catalyst concentration. Olefin saturation pressure is defined as the pressure exerted by the mixture of liquid diluent and olefin when the liquid and vapor phases of said mixture are in equilibrium at a given temperature.

In one aspect of the invention an olefin is polymerized to a normally solid polymer in a liquid full reaction zone in the presence of a liquid diluent and a subdivided polymerization catalyst, polymerization effluent comprising said catalyst, diluent, polymer product and unconsumed olefin being continuously withdrawn from the reaction zone, the effluent flow rate is periodically increased to a quantity exceeding the rate of flow of materials into the reaction zone whereby the volume of liquid in said zone is reduced, a vapor space is formed and olefin vaporizes from the liquid reaction mixture to fill said space. The increased effluent flow rate is maintained until the pressure in the vapor space reaches olefin saturation pressure and the catalyst feed rate to the reaction zone is varied in response to and directly proportional to said saturation pressure.

In another aspect of the invention a portion of the reaction effluent is introduced to a confined zone of variable volume in an amount sufficient to fill said zone liquid full and the volume of said confined zone is then increased to provide a vapor space which fills with olefin vaporized from the reaction effluent. The olefin saturation pressure in said space is measured and the catalyst feed rate to the reaction zone is varied in response to and directly proportional to said saturation pressure.

The normally solid olefins polymers which are processes in the method and apparatus of this invention include polymers or copolymers of monoolefins like ethylene, propylene, butylene, etc., and copolymers of said monoolefins with diolefins such as butadiene. The invention is particularly applicable to polymers of 1-olefins having a maximum of 8 carbon atoms per molecule and no branching nearer the double bond than the 4-position, and more particularly to polymers of ethylene such as "particle form" polymers.

A preferred method for the preparation of normally solid olefin polymers is described in detail in Hogan et al., Patent No. 2,825,721. The method of Hogan et al. utilizes a chromium oxide catalyst containing hexavalent chromium with silica, alumina, silica-alumina, zirconia, thoria, etc. In one embodiment of this patent olefins are polymerized in the presence of a hydrocarbon diluent, for example, an acyclic, alicyclic, or less preferably, aromatic compound which is inert and in which the formed polymer is soluble. The reaction is ordinarily carried out at a temperature between about 150 and about 450° F. and usually under a pressure sufficient to maintain the reactant and diluent in the liquid state.

The chromium oxide catalyst of Hogan et al. can also be employed in the preparation of higher molecular weight and essentially insoluble "particle form" polymers. As previously pointed out, these polymers are formed in association with the polymerization catalyst and are suspended in the liquid diluent in solid particle form. The particle form polymers can be prepared from ethylene and from mixtures of ethylene with other unsaturated hydrocarbons, for example, mixtures of ethylene with minor amounts of higher 1-olefins, such as propylene, 1-butene, 1-pentene, 1-hexene, and the like, and with conjugated and non-conjugated diolefins. The reaction temperature employed varies depending on the particular liquid diluent which is used and on the olefin reactants. Usually, however, polymerization is carried out at 230° F. and below, preferably between about 225° F. and about 150° F. The olefin reactants are contacted in the polymerization zone with a suspension of subdivided chromium oxide catalyst in the liquid hydrocarbon diluent under the aforementioned temperatures and under pressures suitable to maintain the diluent in the liquid phase. Concentration of the catalyst in the reaction zone is preferably maintained constant and within the range of 0.001 to 5 percent by weight based on liquid hydrocarbon diluent. For a more detailed description of the polymerization process including reaction conditions, catalyst, etc., reference can be had to the copending application of Leatherman et al., Serial No. 590,567, filed June 11, 1956.

Other less advantageous procedures which employ different catalysts are also used for preparing olefin polymers. For example, polymers are prepared in the presence of organometallic compounds such as triethylaluminum plus titanium tetrachloride, mixture of ethylaluminum halides with titanium tetrachloride, and the like. Another group of catalysts which is used comprises a halide of a group IV metal such as, for example, titanium tetrachloride, zirconium tetrachloride, tin tetrabromide, etc., with one or more free metals selected from the group consisting of sodium, potassium, lithium, rubidium, zinc, cadmium and aluminum.

The invention is best described by reference to the accompanying drawings of which:

FIGURE 1 is a diagrammatic illustration in cross-section of a polymerization reaction system and a control system suitable for carrying out the invention; and FIGURES 2 and 3 are directed to polymerization reaction systems similar to FIGURE 1, wherein the catalyst control system operates with the reactor liquid full at all times.

Referring to FIGURE 1, ethylene, hydrocarbon diluent, such as n-pentane, and catalyst, for example chromium oxide catalyst containing hexavalent chromium associated with silica-alumina, slurried in hydrocarbon diluent are introduced to polymerization reactor 5 through conduits 2, 3 and 4, respectively. During the polymerization reaction the contents of the reactor are maintained in a highly agitated state by means of a mechanical stirrer 6 which is driven by motor 7. The reaction is carried out at a temperature of about 210° F. and at a pressure of about 430 p.s.i.g., and for a sufficient period of time to convert a portion of the ethylene feed to solid particle form polyethylene. The reaction effluent which comprises a slurry of polymer particles in hydrocarbon diluent, along with catalyst and unreacted ethylene is withdrawn from the reactor through conduit 14 and yielded from the unit. As necessary the reaction effluent can be subjected to further processing for the recovery of polymer, diluent, catalyst and unreacted olefin. Since the reaction effluent comprises a slurry, a conventional ported-type motor valve is subject to considerable erosion and thus cannot be used to control the withdrawal rate of the effluent. Effective control of polymerization effluent removal is provided by flow valves 22, 24 and 26, which operate either entirely open or entirely closed. These valves, which are controlled by a timer 28, operates in the following sequence: With all of the valves closed valve 22 opens to allow flow of reaction effluent into the space between this valve and valve 24. Valve 22 then closes and valve 24 opens allowing expansion of the reaction effluent to fill the space between valves 22 and 26. This provides a substantial reduction in pressure in the effluent, the amount depending on the proportional increase in volume provided by opening valve 24. Valve 26 then opens allowing the lower pressure effluent to flow from the system. Valves 24 and 26 then close to complete the cycle. The described cycle is repeated continuously, with the cycle time being adjusted to provide liquid-full operation of the polymerization reactor. The use of a plurality of valves to remove polymerization reaction effluent makes it possible to employ full opening valves rather than throttling valves and also reduces the period of operation during which high pressure drop is taken across the valves, the combined effect being to substantially reduce excessive wear of valve parts. The timer employed in conjunction with valves 22, 24 and 26 can be any conventional timer, such as for example a Taylor Flex-O-Timer which is described in Taylor Bulletin 98350, August 1954. A particularly suitable timing apparatus which can be used in the aforedescribed system is the sequence controller which is described in the copending application of McKay, Serial No. 657,963, filed May 8, 1957.

In the operation of valves 22, 24 and 26 timer 28 is actuated by air motor 8 which receives air from an air source 10. Air motor 8 communicates with pressure recorder controller 16 which in turn communicates with reactor 5. As noted previously, reactor 5 is operated liquid full. If allowed to seek its own level, the reactor pressure is exerted primarily by the vapor pressure of the monomer, for example ethylene, at the polymerization temperature. To assure liquid full operation of the reactor the set point of pressure recorder controller 16 is adjusted to provide a pressure in the reactor somewhat above the vapor pressure of the hydrocarbon 5 contained therein. When the pressure in the reactor varies from the control set pressure, either upwardly or downwardly, a signal is transmitted to pressure recorder controller 16 which in turn transmits a signal to air motor 8 which adjusts the pressure of the air going to timer 28 to either increase or decrease the total time cycle of valves 22, 24 and 26, depending on the direction of change of pressure in the reactor. For example, if the pressure in the reactor increases to the level where it exceeds the control pressure a signal is transmitted to air motor 8 which resets timer 28 to shorten the time cycle of valves 22, 24 and 26, thereby removing additional reaction effluent until the pressure returns to its former value.

In combination with the aforedescribed reaction system and in accordance with the invention, there is provided an instrumentation system for controlling the polymerization reaction and in particular catalyst concentration in the polymerization reactor. This control system includes pressure recorder 16 and air motor 8, a line connecting pressure recorder controller 16 and air motor 8, said line containing a block valve 11, a control valve 20 disposed in the catalyst feed slurry conduit 4, a timer 18, a line connecting pressure recorder controller 16 with timer 18, said line containing a block valve 12, and a timer 9 communicating with air motor 8 and block valve 12. As pointed out previously, it has been found that the saturation pressure of the olefin in the reactor provides an instantaneous indication of the reactivity (catalyst concentration) of the system. The reactor, however, normally operates liquid full, therefore it is necessary in some manner to provide a gas phase in order that the saturation pressure of the olefin can be measured. Production of a gas phase is provided in the reactor and measurement of the pressure of said phase is effected with the aforedescribed instrumentation system in the following manner. With effluent being withdrawn from the reactor in the normal manner timer 9 transmits a signal which closes valve 11 thereby separating timer 18 and valves 22, 24 and 26 from pressure recorder controller 16. Following the closure of valve 11 air motor 8 is reset by a signal from timer 9 to provide a reduced time cycle for timer 28 thereby increasing the rate of withdrawal of reaction effluent from reactor 5. The new rate of withdrawal of reaction effluent, which is greater than the feed rate of materials to the reactor, reduces the liquid content of the reactor thereby providing a vapor space which is filled by olefin reactant vaporizing from the reaction liquid. After a predetermined reduction in the liquid contents of the reactor has taken place another signal is transmitted from timer 9 to air motor 8 which returns the air motor to its former set point, the air motor in turn acting to return timer 28 to its former cycle. At this point reactor 5 contains a liquid and a vapor phase and effluent is being withdrawn from the reactor substantially at the rate that materials are being introduced thereto. At this point timer 9 transmits a signal to valve 12, opening this valve and interconnecting pressure recorder controller 16 with timer 18. The pressure which is measured by pressure recorder controller 16 is the saturation pressure of the ethylene in reactor 5. If the pressure which is received by pressure recorder controller 16 differs from that received in the previous control cycle of timer 9, timer 18 is reset to provide either an increase or decrease in catalyst slurry to the reactor, depending on whether the olefin saturation pressure has increased or decreased. For example, if the olefin saturation pressure has increased since the previous measurement, thereby indicating a reduction in reactivity, the signal transmitted to timer 18 by pressure recorder controller 16 resets the timer to increase the catalyst flow though valve 20 and thereby increase the polymerization reaction rate reactor 5. After the saturation pressure has been transmitted to timer 18, timer 9 acts to close valve 12 and open valve 11. The normal control system then being in operation timer 28 and valves 22, 24 and 26 operate to return the reactor to normal liquid full operation.

The preceding cycle of control operation, while it involves a considerable number of operations, can be effected in a very short period of time. However, whether the saturation pressure is measured infrequently, for example every half hour, or more frequently such as every 5 to 10 minutes, each measurement involves a change from the normal operation in reactor 5 and thus the control system of FIGURE 1 has the disadvantage of temporarily upsetting the reaction system. A somewhat more flexible and more advantageous operation is provided by the system which is illustrated in FIGURE 2. In the polymerization system of FIGURE 2, ethylene is again polymerized in reactor 5 in the presence of n-pentane diluent and chromium oxide catalyst, and polymerization reaction effluent is withdrawn through a series of valves 22, 24 and 26 controlled by timer 28 in the same manner as previously described in the discussion of FIGURE 1. In this embodiment of the invention control of catalyst concentration in the reactor is provided by measuring the olefin saturation pressure of a portion of the reaction effluent, which is separated from the principal product stream prior to passage of this stream through valves 22, 24 and 26. The separated effluent is passed through a bypass vessel 34 of variable volume wherein the olefin saturation pressure is measured and is thereafter recombined with the reaction effluent through conduit 50. Bypass vessel 34 comprises an elongated vessel having a block valve 32 at the inlet and a second block valve 48 at the outlet. A side conduit 36 is provided in the bypass vessel, said conduit containing a movable piston 38 which is driven by driver 42. A second side outlet is provided from bypass 34, connecting this bypass with pressure recorder controller 17. The second outlet contains a block valve 46 which is connected by a mechanical linkage 44 with the shaft of piston 38 at 40. A timer (not shown) similar to timer 9 of FIGURE 1 is provided to actuate the valves and other mechanisms of the bypass vessel.

In the operation of the control system of FIGURE 2, with the valves initially closed and the piston 38 fully extended, valve 32 is opened allowing introduction of reaction effluent to bypass vessel 34. After this vessel fills valve 32 is closed and piston 38 is retracted, thereby increasing the volume of the bypass vessel. Olefin dissolved in the reaction effluent vaporizes to fill the increased volume. Retraction of piston 38 actuates mechanical linkage 44 which opens valve 46, thereby interconnecting the bypass vessel with pressure recorder controller 17. The saturation pressure of the olefin in the vapor space of the bypass vessel is transmitted to pressure recorder controller 17 which in turn transmits a signal to timer 18 which controls valve 20, through which catalyst slurry is introduced to reactor 5. If the measured saturation pressure has not changed from the pressure measured during the next preceding cycle of the control system the catalyst slurry to the reactor remains unchanged. However, any change in the saturation pressure is transmitted through the instrumentation system as described to provide an appropriate change in catalyst slurry, the direction of change being determined by the corresponding change in the olefin saturation pressure.

The apparatus of FIGURE 2 provides a number of advantages over the control system set forth in FIGURE 1. Since measurement of olefin saturation pressure is conducted with reaction effluent the reactor 5 is always operated liquid full and the operation of timer 28 and valves 22, 24 and 26 is never interrupted. In addition bypass vessel 34 can be substantially smaller than reactor 5, thus the cycle of operation of the control system can be considerably shorter. In view of this and in view of the fact that the reactor itself is not involved in the operation, the measurement of olefin saturation pressure can be carried out at very frequent intervals and substantially on a continuous basis if desired.

FIGURE 3 provides a second alternate method of controlling catalyst concentration in which a portion of the reaction effluent again is utilized for the determination of olefin saturation pressure. In FIGURE 3 olefin saturation pressure is measured in an elongated vessel 55 which is divided into two sections 56 and 64 by block valve 62. In addition vessel 55 is provided an inlet block valve 54 and an outlet block valve 66. A line containing a block valve 60 connects vessel 55 with pressure recorder controller 17. As in FIGURE 2 pressure recorder controller 17 communicates with timer 18 which actuates valve 20 in catalyst slurry line 4. Also, as in FIGURE 2, a timer (not shown) is provided for actuating the valves of the control system. The control cycle is carried out as follows: With all of the valves originally being closed, valve 54 is opened allowing entrance of reaction effluent into the upper section 56 of vessel 55. When section 56 is filled valve 54 closes and valve 62 is opened thereby allowing flow of effluent into section 64 of vessel 55. The increased volume provided thereby is filled with olefin which vaporizes from reaction effluent. Following this operation valve 60 is opened which allows the saturation pressure of the olefin to be transmitted from vessel 55 to pressure recorder controller 17. Subsequent operation of the control system is the same as that described above in the discussion of FIGURE 2.

In the operation of the described control systems when the volume provided for the reaction effluent is increased to provide a vapor space an interval of time is necessary before the system reaches equilibrium and olefin saturation pressure is attained. By utilizing the apparatus of FIGURE 3 the opening of valve 60 can be delayed for a sufficient period of time after valve 62 is opened to assure that the olefin has reached saturation pressure before pressure is transmitted to pressure recorder controller 17. In this respect the apparatus of FIGURE 3 provides an advantage over the apparatus of FIGURE 2 since in the latter control system valve 46 commences to open as soon as piston 38 starts to move. However, it is not necessary in the operation of FIGURE 2 that a mechanical linkage be provided between piston 38 and valve 46. Thus, the timer of FIGURE 2 can operate directly on valve 46 and delay opening of this valve for a suitable period of time after the piston 38 completes its retraction, or valve 46 can be controlled by piston 38 in some other suitable manner to provide delay in the opening of this valve for the desired period of time.

The increase in volume provided by the control systems to provide space for vaporization of olefin can be varied in magnitude as desired and will depend on the particular polymerization process which is being carried out. In general, it is desirable that the vapor volume be between about 0.1 and about 10 percent of the original liquid volume. Thus, for example in the system of FIGURE 1, the olefin stauration pressure is measured in a vapor space which is between about 0.2 and about 5 percent of the total reactor volume.

The preceding discussion has been directed to certain preferred embodiments of the invention; however, this is not to be taken in any limiting sense. Thus, while the invention has been described in combination with a polymerization process for the production of particle form polymer, it is within the scope of the invention to control polymerization reactions in general as set forth in the preceding discussion. While certain particular apparatus and control schemes have been described it is also within the scope of the invention to employ apparatus and control systems other than those set forth in the figures. The figures have been described as controlling flow of catalyst slurry to the reactor, however, other methods can be employed as long as the ultimate result is control of catalyst concentration in the reaction system. For example, if catalyst is fed to the reactor in the dry state, for example by a mechanical feeder, the control system can be utilized to control such a feeder. Again, where catalyst is slurried to the reactor the control system can be utilized to control the slurrying liquid rather than the resulting catalyst slurry. It is contemplated that the instruments utilized in carrying out the different functions of the control system are conventional instruments in the art; thus any conventional pressure recorder controllers, air motors, flow valves, block valves, etc., can be used in carrying out the invention.

The following example is presented in illustration of the invention:

*Example*

Polymerization of ethylene is carried out in the presence of n-pentane and chromium oxide catalyst containing hexavalent chromium associated with silica-alumina in a reaction system similar to that illustrated in FIGURES 1, 2 and 3. The polymerization reaction is carried out at a temperature of about 220° F. Pressure recorder controller 16 is given an index setting of 425 p.s.i.g. This controller controls the operation of timer 28 such that valves 22, 24 and 26 operate in cycle to withdraw reaction effluent at the same rate that materials are introduced to the reactor. In the normal operation of the reaction and control system a portion of the polymerization reaction effluent (according to FIGURE 2) is introduced to bypass 34 through valve 32, which valve is closed after the bypass is filled. Piston 38 is then retracted to increase the volume of the bypass vessel by about 0.8 percent. At the same time valve 46 connecting bypass vessel 34 and pressure recorder controller 17 is opened. The increase in volume in the bypass vessel 34 provides a vapor space which is filled with ethylene released from the reaction effluent. The pressure which results is the saturation pressure of the ethylene which is normally about 380 p.s.i.g. under the conditions of this example. This pressure corresponds to the normal setting of pressure recorder controller 17 and thus does not vary the time sequence of timer 18 or the amount of catalyst slurry introduced to the reactor through conduit 4.

During the polymerization reaction the activity of the catalyst in reactor 5 is decreased because of decreased activity of the fresh catalyst being introduced. As a result less olefin is consumed and the polymerization reaction temperature begins to decrease. These changes are reflected in the olefin saturation pressure which is measured in bypass vessel 34 during one of the operating cycles of the control instrumentation system. The decreased saturation pressure when transmitted to pressure recorder controller 17 resets this controller which in turn resets the time cycle of timer 18 which transmits a signal to valve 20 whereby the quantity of catalyst slurry entering the reactor is increased. The increased flow of slurry is maintained until the olefin saturation pressure is returned to the desired level, after which the slurry flow is reduced to its previous level. Due to the sensitivity of olefin saturation pressure to changes in the reactivity of the system, the changes in slurry flow rate are effected with very little change in the polymerization reaction temperature.

Having thus described the invention by providing a specific example thereof, it is to be understood that no undue restrictions are to be drawn by reason thereof and that many variations and modifications are within the scope of the invention.

I claim:

1. Apparatus comprising in combination a polymerization reactor, means for introducing liquid diluent, olefin and catalyst to said reactor, means for withdrawing reaction effluent from said reactor, a vessel communicating with said means for withdrawing reaction effluent, means for periodically vapor sealing said vessel, means for increasing the volume of the sealed vessel, means for measuring pressure in said vessel and means for varying the quantity of catalyst introduced to the reactor in response to and directly proportional to the pressure in said vessel.

2. The apparatus of claim 1 in which the volume of said vessel is increased between about 0.1 and about 10 percent.

3. Apparatus comprising in combination a polymerization reactor, means for introducing liquid diluent, olefin and catalyst to said reactor, means for withdrawing reaction effluent from said reactor, an elongated vessel communicating with said means for withdrawing reaction effluent, having closure means at each end, side conduit means in open communication with said vessel containing a piston, second side conduit means containing a closure means communicating with means for measuring pressure, means for actuating said piston, means for opening the closure means in said second side conduit means and means for varying the quantity of catalyst introduced to the reactor in response to and directly proportional to the pressure in said vessel.

4. Apparatus comprising in combination a polymerization reactor, conduits for introducing liquid diluent, olefin and catalyst to said reactor, a conduit for withdrawing reaction effluent from said reactor, a bypass around the conduit for withdrawing reaction effluent, said bypass having block valves at each end, a side conduit containing a piston in open communication with said bypass between said block valves, a second side conduit from said bypass between said block valves, containing a block valve and communicating with a pressure measuring device, a driver for actuating said piston, a linkage associated with said piston for opening and closing the block valve in the second side conduit and a flow controller communicating with the pressure measuring device adapted to vary the quantity of catalyst introduced to the reactor in response to and directly proportional to pressure in said bypass.

5. The apparatus of claim 4 in which the piston when retracted provides an increase in volume in the bypass of between about 0.1 and about 10 percent.

6. Apparatus comprising in combination a polymerization reactor, means for introducing liquid diluent, olefin and catalyst to said reactor, means for withdrawing reaction effluent from said reactor, an elongated vessel containing closure means at each end and in an intermediate portion thereof, communicating with said means for withdrawing reaction effluent, a side conduit means communicating with said elongated vessel between the inlet closure means and the intermediate closure means and communicating with means for measuring pressure, said side conduit means containing a closure means, and means for varying the quantity of catalyst introduced to the reactor in response to and directly proportional to pressure in said elongated vessel.

7. Apparatus comprising in combination a polymerization reactor, conduits for introducing liquid diluent, olefin and catalyst to said reactor, a conduit for withdrawing reaction effluent from said reactor, a bypass around said conduit for withdrawing reaction effluent, said bypass containing a block valve at each end and in an intermediate portion thereof, a side conduit in open communication with said bypass between the inlet block valve and the intermediate block valve, and communicating with a pressure measuring device, said side conduit containing a block valve, a flow controller actuated by said pressure device and adapted to vary the quantity of catalyst introduced to the reactor in response to and directly proportional to the pressure in said bypass.

8. The apparatus of claim 7 in which instrumentation means are provided to operate the block valves in the bypass in time cycle in the following sequence: with all of the valves initially being closed, the upstream block valve opens to admit reactor effluent, when the bypass is full the upstream block valve closes, the intermediate block valve opens allowing effluent to enter the downstream portion of the bypass and provide a vapor space in said bypass, the side conduit block valve opens allowing transmission of pressure through the side conduit to the pressure measuring device, the side conduit block valve closes, the downstream bypass block valve opens allowing flow of reaction product from the downstream portion of the bypass, the downstream bypass block valve closes, and the intermediate bypass block valve closes to complete the cycle.

9. The apparatus of claim 4 in which instrumentation means are provided to operate the block valves in the bypass in time cycle in the following sequence: with the upstream and downstream bypass block valves open, the second side conduit block valve closed and the piston in the first side conduit fully extended, the downstream block valve closes, the upstream block valve closes thereby sealing the bypass, the piston in the first side conduit is retracted, providing a vapor space in the bypass, simultaneous with retraction of the piston the block valve in the second side conduit opens allowing transmission of pressure to the pressure recording device, the piston is returned to its original position, simultaneously the block valve in the second side conduit closes, the upstream block valve opens and the downstream block valve opens to complete the cycle.

References Cited in the file of this patent
UNITED STATES PATENTS

| | | |
|---|---|---|
| 2,440,822 | Hachmuth | May 4, 1948 |
| 2,543,791 | Malin | Mar. 6, 1951 |
| 2,814,551 | Broeze et al. | Nov. 26, 1957 |
| 2,816,858 | Walker | Dec. 17, 1957 |
| 2,886,616 | Mertz | May 12, 1959 |
| 2,897,247 | Marak | July 28, 1959 |
| 2,908,734 | Cottle | Oct. 13, 1959 |